United States Patent
Demon et al.

(10) Patent No.: US 11,950,539 B2
(45) Date of Patent: Apr. 9, 2024

(54) AGRICULTURAL SYSTEM

(71) Applicant: CNH Industrial America LLC, New Holland, PA (US)

(72) Inventors: Frederik Demon, Bruges (BE); Xavier G J M Bonte, Zuidzande (NL); Karel C F Pauwels, Ingelmunster (BE)

(73) Assignee: CNH Industrial America LLC, New Holland, PA (US)

( * ) Notice: Subject to any disclaimer, the term of this patent is extended or adjusted under 35 U.S.C. 154(b) by 777 days.

(21) Appl. No.: 17/093,546

(22) Filed: Nov. 9, 2020

(65) Prior Publication Data
US 2021/0137019 A1 May 13, 2021

(30) Foreign Application Priority Data

Nov. 8, 2019 (EP) ..................................... 19208195

(51) Int. Cl.
*A01F 15/08* (2006.01)
*F03G 3/08* (2006.01)
*B62D 49/06* (2006.01)

(52) U.S. Cl.
CPC ............ *A01F 15/0841* (2013.01); *F03G 3/08* (2013.01); *B62D 49/065* (2013.01)

(58) Field of Classification Search
CPC .......................... A01F 15/0841; A01F 15/085
See application file for complete search history.

(56) References Cited

U.S. PATENT DOCUMENTS

| | | | | |
|---|---|---|---|---|
| 6,701,834 B2 * | 3/2004 | Roth | ................... | A01F 15/0841 100/270 |
| 8,973,493 B2 * | 3/2015 | O'Reilly | ............. | A01F 15/0841 100/280 |
| 9,585,297 B2 * | 3/2017 | Bonte | ................... | A01B 61/025 |
| 10,091,942 B2 * | 10/2018 | Retzlaff | .............. | A01F 15/0875 |
| 10,806,092 B2 * | 10/2020 | Thies | ...................... | A01F 15/10 |
| 10,820,529 B2 * | 11/2020 | Figger | ................. | A01F 15/0841 |
| 2003/0167939 A1 | 9/2003 | Roth | | |
| 2017/0112068 A1 | 4/2017 | Morselli et al. | | |

FOREIGN PATENT DOCUMENTS

WO    2011/018456 A1    2/2011

OTHER PUBLICATIONS

Extended European Search Report for EP application 19208195.8, dated Apr. 29, 2020 (8 pages).

* cited by examiner

*Primary Examiner* — Matthew Katcoff
(74) *Attorney, Agent, or Firm* — Peter K. Zacharias

(57) ABSTRACT

An agricultural system including an agricultural baler including a rotary input shaft connectable by way of a baler driveline to a rotatable flywheel; a hydraulic pump for supplying the agricultural baler with hydraulic fluid, the rotatable flywheel being connectable to the hydraulic pump via the driveline. The baler is transferrable between a first state for driving the hydraulic pump by external drive power provided by a corresponding work vehicle, and a second state for driving the hydraulic pump by the rotatable flywheel. The agricultural system further includes a control unit that is configured to: receive input-power-data indicative of a drive power available for driving the hydraulic pump in the first state of the baler; and determine a control-signal for transferring the baler into the second state, if the input-power-data indicates that the available drive power is insufficient for driving the hydraulic pump.

14 Claims, 4 Drawing Sheets

AGRICULTURAL SYSTEM

FIELD OF THE INVENTION

The invention relates to an agricultural baling system, particularly but not exclusively, comprising an agricultural baler implement. Other aspects of the present invention relate to an agricultural machinery, such as a combination of a tractor and a baler, a method of controlling an agricultural baler, the use of a flywheel to drive parts of the agricultural baling system.

BACKGROUND OF THE INVENTION

Balers are well known in agriculture and are widely used to bale plant matter in fields into bales that may be conveniently and effectively handled, stored and used. Balers are known that bale forage products such as grass and other leaves used as hay or other types of animal feed; straw or other plant parts resulting as by-products from a harvesting operation such as combine harvesting; cotton; and other plant parts of commercial or other value.

The majority of balers in use in Europe are designed to be towed behind an agricultural tractor or another towing vehicle that, under the control of an operator and/or using operator-monitored software, moves the baler about a field and provides power to operate internal parts of the baler. The provision of power is effected by way of a rotatable power take-off (PTO) shaft connected to the rotary power take-off that typically is part of the tractor.

Known designs of agricultural baler include a pick-up, mounted at the front of the machine, that causes the ingestion of plant matter into the interior of the machine as it moves about a field. Differing internal designs of baler components are known in the part of the machine downstream of the pick-up.

One commonplace type of baler is often referred to as a "rectangular baler". This includes a cuboidal bale-forming chamber in which the ingested plant matter is compacted into a cuboidal shape by a piston or plunger that reciprocates longitudinally back and forth inside the bale-forming chamber between retracted and extended positions. Charges of plant matter repeatedly are fed into the bale-forming chamber from the pick-up by the mechanism of the baler. This action is timed with the motion of the plunger such that feeding of plant matter coincides with retraction of the plunger to one end of the bale-forming chamber. The plant matter then is compacted by subsequent extension strokes of the plunger along the bale-forming chamber.

The reciprocal rectilinear motion of the plunger is effected using a driveline that converts rotary drive derived from the rotating PTO shaft, connected to the baler above the pick-up, into reciprocal motion of the plunger. This typically is achieved by changing, in the driveline, the axis of the rotation from one parallel to the longitudinal length of the baler to an axis of rotation transverse thereto.

Such transverse-axis rotation is applied to a crank that is pivot-jointed to one end of a conrod the other end of which is pivot-jointed to the plunger, that is moveably captive inside the bale-forming chamber. As a result, rotation of the crank causes the reciprocal movement of the plunger.

The driveline between the power take-off of the tractor and the plunger includes a clutch that in a typical case is formed of two or more dry friction plates that are urged into mutual engagement by a hydraulic actuator or spring arrangement. Additionally a heavy flywheel (that in some baler designs weighs 600 kg or more) is secured to a rotatable shaft that defines or is connected to an input shaft in turn connected in use to the PTO shaft.

The flywheel is needed because the plunger during its motion is associated with very high, and highly varying, levels of power that might peak at 1500 Hp (about 1100 kW). In the absence of the flywheel it might be impossible for the rotary power take-off of a tractor to provide sufficient power to move the plunger, and very high forces might be transmitted back towards the tractor via the PTO shaft potentially causing damage to the baler or tractor or making the tractor-baler combination difficult to control.

The flywheel has high levels of inertia and, in order to prevent injuries, it is desirable to stop rotation of the flywheel as swiftly as possible once the PTO shaft has stopped providing power to the agricultural baler (e.g. when the tractor engine is turned off). Existing devices for stopping the flywheel without access to external power provided by the PTO shaft are dissatisfactory.

The invention seeks to solve or ameliorate one or more problems of prior art balers.

Embodiments of the invention are suitable for inclusion in all baler types and machinery combinations disclosed herein. The disclosure of embodiments or parts of embodiments herein includes their disclosure in combination with all baler types and machinery combinations herein, even if these are indicated as forming part of the prior art.

The terms "baling machine" and "baler" are used synonymously herein and in the art generally.

The term "power take-off" is synonymous with the acronym "PTO".

The term "tractor" embraces a wide variety of machines potentially capable of towing a baler, as will be known to the person of skill in the art.

The term "clutch" except as otherwise explained embraces any design of clutch that is suitable for transferring drive in the circumstances described.

The term "plant matter" and derivatives potentially includes all types of matter that potentially may be ingested into a baler for the purpose of being formed into bales.

The terms "piston" and "plunger" in the context of the principal, moveable, bale-forming part of a bale-forming chamber are used synonymously herein.

SUMMARY OF THE INVENTION

Aspects and embodiments of the disclosure provide an agricultural baler, an agricultural machinery and a method for controlling an agricultural baler as claimed in the appended claims.

According to a first aspect of the present disclosure, there is provided an agricultural system comprising an agricultural baler that comprises:

a rotary input shaft connectable by way of a baler driveline to a rotatable flywheel;

a hydraulic pump for supplying the agricultural baler with hydraulic fluid, the rotatable flywheel being connectable to the hydraulic pump via the driveline, wherein the baler is transferrable between a first state for driving the hydraulic pump by means of external drive power provided by a corresponding work vehicle, and a second state for driving the hydraulic pump by means of internal drive power, particularly provided by means of a rotatable flywheel, The system further comprises a control unit that is configured to:

receive input-power-data indicative of a drive power available for driving the hydraulic pump in the first state of the baler; and determine a control-signal for transferring the baler into its second state, if the input-power-data indicates that the available drive power is insufficient for driving the hydraulic pump.

In another embodiment, the driveline comprises at least one brake for braking a rotation of the flywheel, and wherein the control unit is configured to determine a control-signal applicable to activate the brake, when the baler is in its second state.

In another embodiment, the input-power-data is indicative of an input shaft speed, and wherein the control unit is configured to determine a control-signal for transferring the baler into its second state, if the input-power-data indicates that the input shaft speed is below a predetermined input-speed-threshold.

In another embodiment, the driveline includes a transmission including driveline components defining at least first and second selectable transmission ratios between the input shaft and the flywheel, wherein, in the first state of the baler, the first transmission ratio is a reduction ratio and the second transmission ratio is an acceleration ratio, and wherein, in the second state of the baler, the first transmission ratio is an acceleration ratio and the second transmission ratio is a reduction ratio.

In another embodiment, the control unit is configured to determine a control-signal applicable to selectively engage driveline components defining the second transmission ratio, when the baler is in its first state.

In another embodiment, the control unit is configured to determine a control-signal applicable to selectively engage driveline components defining the first transmission ratio, when the baler is in its second state.

In another embodiment, the transmission comprises a first clutch for selectively activating the first transmission ratio, and wherein the hydraulic pump is selectively connectable to the first clutch for provision of hydraulic fluid for selectively engaging the first clutch.

In another embodiment, the transmission comprises a second clutch for selectively activating the second transmission ratio, and wherein the hydraulic pump is selectively connectable to the second clutch for provision of hydraulic fluid for selectively engaging the second clutch.

In another embodiment, the agricultural baler comprises an accumulator connected to a pump outlet of the hydraulic pump, and wherein the control unit is configured to charge the accumulator via the hydraulic pump, when the baler is in its first state.

In another embodiment, the accumulator is selectively connectable to the at least one brake for selectively supplying hydraulic fluid to the at least one brake, when the baler is in its second state.

In another embodiment, the agricultural baler comprises a one-way clutch for connecting the rotatable input shaft to a power take-off shaft of a corresponding work vehicle, the one-way clutch permitting power transfer from the power take-off shaft towards the input shaft, and said one-way clutch preventing power transfer from the input shaft towards the power take-off shaft.

In another embodiment, the agricultural system comprises an agricultural work vehicle connected to the agricultural baler.

In another embodiment, the agricultural work vehicle comprises a power take-off shaft connectable to the input shaft of the agricultural baler for rotationally driving the input shaft.

According to another aspect of the present disclosure, there is provided a computer-implemented method for controlling an agricultural baler, said baler comprising a rotary input shaft connectable by way of a baler driveline to a rotatable flywheel and a hydraulic pump for supplying the agricultural baler with hydraulic fluid, the rotatable flywheel being connectable to the hydraulic pump via the driveline. The method comprises receiving input-power-data indicative of an external drive power available for driving the hydraulic pump in the first state of the baler and determining a control-signal for driving the hydraulic pump by means of the rotatable flywheel, if the input-power-data indicates that the available external drive power is insufficient for driving the hydraulic pump.

According to another aspect of the present disclosure, there is provided a method for driving a hydraulic pump of an agricultural baler via a flywheel of the baler.

In one embodiment, the method may include a step for driving the hydraulic pump by means of the flywheel, if an external drive power provided to the agricultural baler is insufficient for driving the hydraulic pump.

According to another aspect of the present disclosure, there is provided an agricultural system comprising any agricultural baler disclosed (e.g. a baler implement) and an agricultural vehicle for transporting and powering the agricultural baler implement. There may be provided a computer program, which when run on a computer, causes the computer to configure any apparatus, including a control unit, disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

The agricultural work vehicle (or tractor) may include one or more control devices, such as but not limited to programmable or non-programmable processors. Similarly, the baler implement may include one or more control devices, such as but not limited to programmable or non-programmable processors. Additionally, or alternatively, the baler implement may be controlled by one or more control devices of the agricultural work vehicle. Similarly, the agricultural work vehicle may be controlled by one or more control devices of the baler implement.

The agricultural work vehicle and/or the baler implement may be remote controlled, e.g. from a farm office. Accordingly, the agricultural work vehicle may include one or more communication interfaces for connection to a remote processor and/or a remote controller. Similarly, the baler implement may include one or more communication interfaces for connection to a remote processor and/or a remote controller.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

There now follows a description of preferred embodiments of the invention, by way of non-limiting example, with reference being made to the accompanying drawings in which.

DETAILED DESCRIPTION OF THE DRAWINGS

Figure 1:
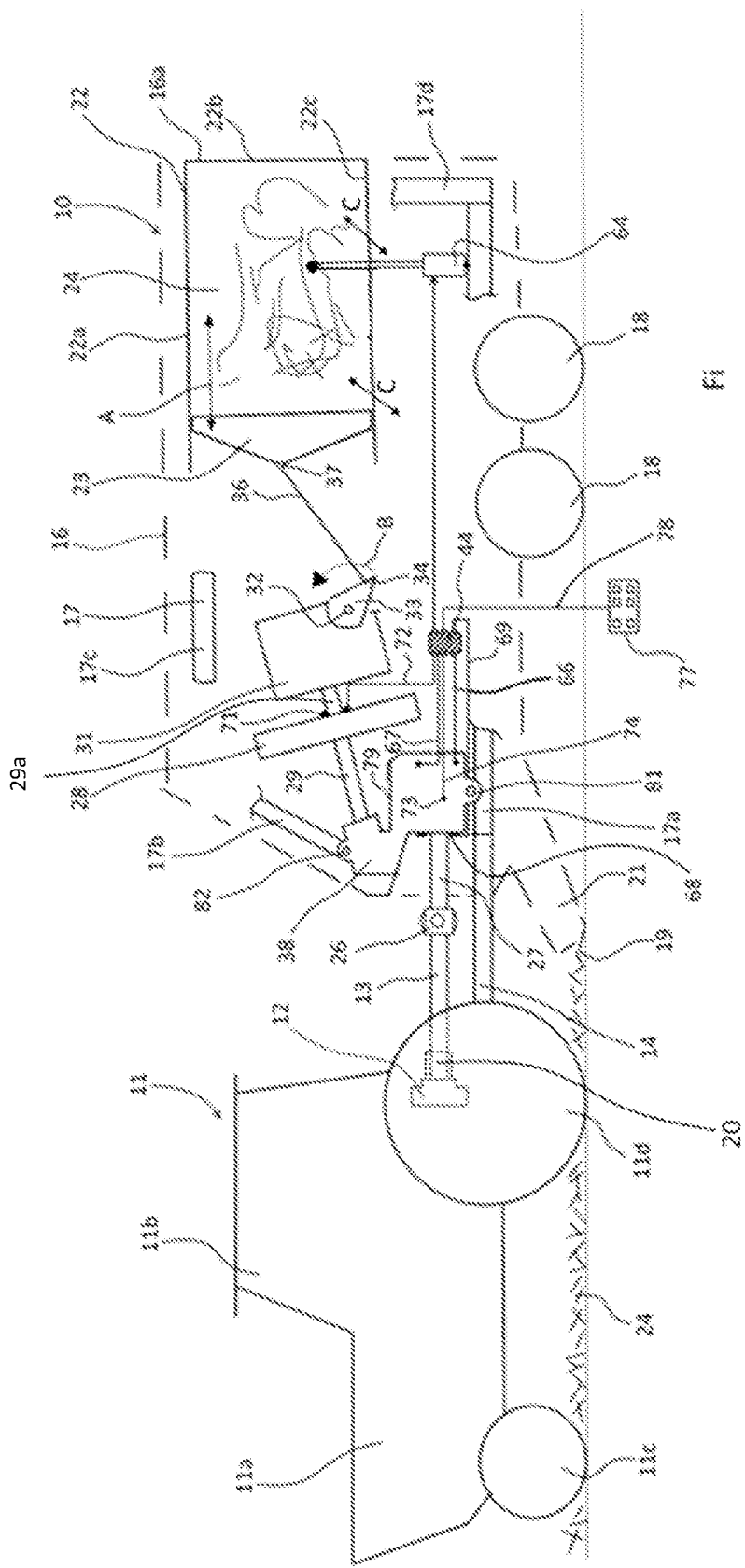
FIG. 1 is a schematic representation of an agricultural baler comprising a baler implement and a work vehicle.

Referring to the drawings an agricultural baling system is shown comprising an agricultural baler 10 being towed behind an agricultural work vehicle (towing vehicle) that in the illustrated embodiment non-limitingly is an agricultural tractor 11.

The tractor 11 is a conventional tractor including a vehicle frame/body 11a, rear-mounted cab 11b, front, steerable, ground-engaging wheels 11c and rear, driven, ground-engaging wheels 11d. Tractor 11 includes at its rear end between the rear wheels 11d a power take-off 12 of a conventional design that includes a rotative coupling for a PTO shaft 13 that extends rearwardly of the tractor 11. The PTO 12 may be engaged to cause rotation of the PTO shaft 13 or disengaged, such that the shaft 13 is not powered to rotate, for example through the operation of a control lever or pushbutton.

The tractor 11 may have any of a range of engine power outputs including but not limited to 200 hp, 300 hp and 400 hp. The baler 10 is operable when towed by any such tractor 11, without a need for adjustment or modification, for the reasons explained below.

The PTO shaft 13 may be any of a variety of lengths. A relatively short PTO shaft 13 and drawbar 14 (described below) minimises the distance between the pick-up 19 (described below) of the baler 10 and the tractor 10. This provides certain advantages, although in some other respects a longer PTO shaft 13 may provide good adjustment flexibility.

The partial driveline represented by the PTO 12 and PTO shaft 13 may in various types of tractor include a PTO clutch 20 that facilitates engagement and disengagement of the PTO shaft. The PTO clutch 20 is shown schematically in FIG. 1. It may readily be envisaged by the person of skill in the art and typically would be a one-way clutch of a kind that permits free movement when rotating in one direction, and transfers rotary drive via the PTO shaft 13 when rotating in the opposite direction. Other forms and locations are possible in respect of the clutch 20.

The baler 10, i.e. a baling implement, is secured to the rear of the tractor 11 by way of a drawbar 14 that typically is of an "A"-shape when viewed in plan and extends forwardly of the baler 10 below the PTO shaft 13. The drawbar 14 is pivotably secured to a conventional towing hitch at the rear of the tractor 11.

The baler 10 includes a housing or cover 16 that may take a variety of forms. The housing 16 in most baler designs includes a section 16a that is open to permit ejection of formed bales at the rear of the baler 10.

Panels defining the housing 16 further may be openable or removable in order to permit maintenance of the interior parts of the baler 10 replacement of bobbins of twine used for tying completed bales or the clearance of blockages that can arise for a variety of reasons.

The housing 16 of the baler 10 is secured to a baler frame 17 selected parts 17a, 17b, 17c, 17d of which are illustrated in FIG. 1, with the complete frame 17 being omitted for ease of illustration.

The baler 10 is mobile and to this end it includes secured to the frame 17 two or more ground-engaging wheels 18.

In the embodiment illustrated, four wheels are provided, being left and right front wheels and left and right rear wheels 18. In FIG. 1 the left-hand side front and rear wheels are visible.

In this regard the front or forward end of the baler 10 is the end of it that is closest to the towing tractor 11, and the terms "rear", "left", "right", "upper", "lower" and derivative terms are interpreted accordingly and as though an observer is looking forwardly along the baler 10.

The wheels 18 may be mounted relative to the frame 17 by way of suspension components and passive or active steering components as would be known to the person of skill in the art, or they may be mounted more simply. The wheels 18 optionally may include tyres and/or gripping elements that are omitted from FIG. 1 for ease of viewing.

A pick-up 19 projects forwardly of the baler 10 and is arranged to collect cut plant matter 24 lying in a field in which the baler 10 moves as influenced by the motion of the tractor 11. The pick-up 19 passes the plant matter to a conveyor 21. The conveyor 21 conveys the plant matter inside the baler 10 where it undergoes baling.

Numerous designs of pick-up 19 and conveyor 21 are known in the baler art and fall within the scope of embodiments disclosed herein. The precise designs of the pick-up 19 and conveyor 21 are essentially immaterial to the nature and operation of the invention, and therefore are not described in detail.

As mentioned, the baler 10 includes an internal bale-forming chamber 22. This is an elongate, cuboidal volume defined by chamber walls of which top and bottom walls 22a and 22c are visible in FIG. 1. The bale-forming chamber 22 in a typical baler design extends in a fore and aft direction in an upper part of the rear of the volume enclosed by the housing 16.

The rear 22b of the bale-forming chamber coincides with the aforementioned open housing section 16a in order to allow ejection of completed bales in a per se known manner.

A crop flow path exists inside the baler 10 between the conveyor 21 and the bale-forming chamber 22. The crop flow path may readily be envisaged and is omitted from the figures for clarity.

The forwardmost end of the bale-forming chamber 22 is essentially open. A plunger 23 occupies the interior cross-section of the bale-forming chamber 22 and is constrained to move longitudinally inside the chamber 22 from the open, forward end towards and away from the rear 22b of the bale-forming chamber 22 as signified by arrow A.

The PTO shaft 13 as mentioned may be powered to rotate, in virtually all tractors in a clockwise direction when viewed from behind the tractor 11. PTO shaft 13 is connected by way of at least one, and in practice at least two, universal joint 26 to the forwardmost end of a rotary input shaft 27 of the baler 10. The universal joint 26 in a well-known manner accommodates changes in the relative orientation of the tractor 11 and baler 10 that result from towing of the baler from place to place, e.g. while the baler is working or when it is travelling between fields.

The input shaft 27 is supported e.g. using journal bearings that are omitted from FIG. 1 for ease of viewing and connects by way of a driveline, described in more detail below, to a rotatable flywheel 28.

The flywheel 28 is supported on a flywheel shaft 29 that also is supported using journal bearings, or a functionally similar arrangement, that further is omitted from FIG. 1. The functions of the flywheel 28 are as described above, although as explained it is possible for the flywheel 28 in embodiments of the invention to be made considerably lighter than some prior art flywheels.

The rear end 29a of the flywheel shaft 29 is a rotary input to a drive converter 31 or similar transmission that by way of intermeshing gear components alters the axis of rotation of rotative energy in the baler 10. This drive converter 31 may be referred to as a main transmission in some examples.

The nature of the drive converter 31 thus is such that the longitudinally extending (with reference to the elongate length of the baler 10 as illustrated) axis of rotation of the flywheel shaft 29 becomes rotation about a transversely extending axis of a crankshaft 32.

The crankshaft 32 is connected to a pair of crank members (only the right one is shown as 33) that protrude from the drive converter 31 in a manner presenting free ends. The pair of crank members and corresponding conrods (only the right one shown as 36) connect the crankshaft 32 of the drive converter 31 with the forward side of the plunger 23. A first, right side crank member 33 has a first end connected to the crankshaft 32 of the drive converter 31. A second end of the first, right side crank member 33 is connected to a first end 34 of a first, right side conrod 36. The first, right side conrod 36 has a second end 37 connected to the plunger 23. A second, left side crank member (not shown) has a first end connected to the crankshaft 32 of the drive converter 31. A second end of the second, left side crank member is connected to a first end of a second, left side conrod (not shown). The second, left side conrod has a second end (not shown) connected to the plunger 23.

As is apparent from FIG. 1, therefore, rotation of crankshaft 32 causes rotation of crank member 33, as signified by arrow B, that gives rise to the rectilinear, reciprocal motion of plunger 23 indicated by arrow A.

In this regard it is somewhat arbitrary whether crank 33 rotates clockwise or anti-clockwise, since reciprocal motion of the plunger 23 may in an appropriately designed set of driveline elements be achieved regardless of the direction of rotation of the crank 33. The actual rotational direction of the crank 33 would be a consequence of the internal design of the drive converter 31. Such aspects are not relevant to an understanding of the invention, and therefore are not provided in detail herein.

Charges of plant matter 24 conveyed inside the baler 10 from the conveyor 21 repeatedly are at intervals fed by internal components of the baler 10, that are omitted from FIG. 1 for clarity, into the interior of the bale-forming chamber 22 for compaction by reason of the reciprocal, rectilinear motion (arrow A) of the plunger 23. The feeding of each charge of plant matter 24 is timed to coincide with positioning of the plunger 23 at its retracted, i.e. forwardmost position, with the result that the plant matter 24 becomes compressed and compacted by the movement of the plunger 23 into bale form after it has been fed in to the bale-forming chamber 22.

The driveline defined between the input shaft 27 and the flywheel shaft 29 includes a transmission 38 that is described below in relation to FIGS. 2 and 3.

The baler of the present disclosure may generally be operated in two states. In a first state, drive power is provided by the PTO shaft 13. In a second state, e.g. when the tractor engine has been turned off and/or when the tractor's PTO clutch 20 has been disconnected, drive power may be provided by the remaining inertia of the flywheel 28. It will be appreciated that, in the second state, drive power is only available for a limited amount of time, e.g. until the flywheel has come to a complete standstill. In the following, the baler shall firstly be described with reference to its first state.

Figure 2:
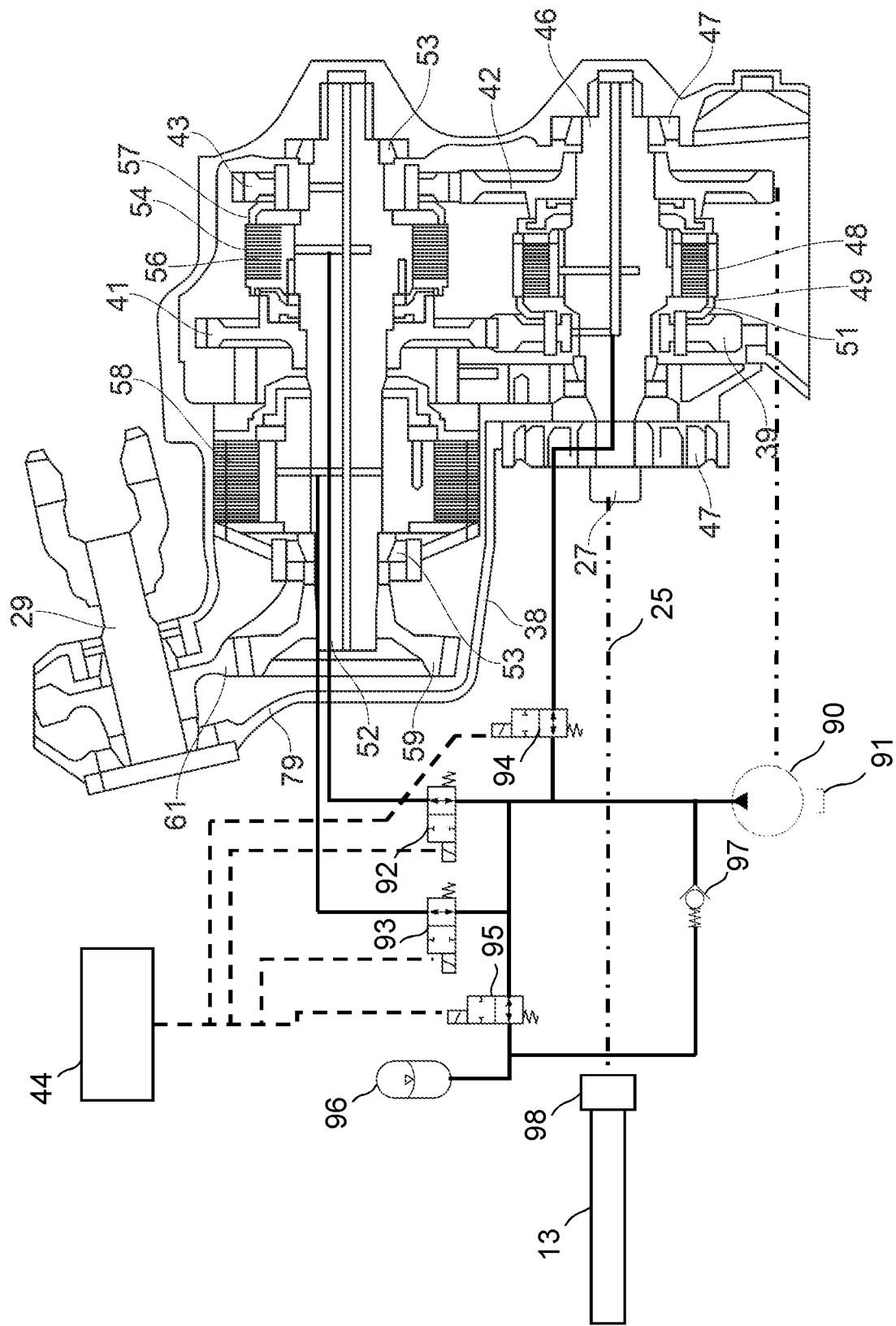
FIG. 2 is a cross-sectional view of a transmission, forming part of the baler visible in FIG. 1.
Figure 3:
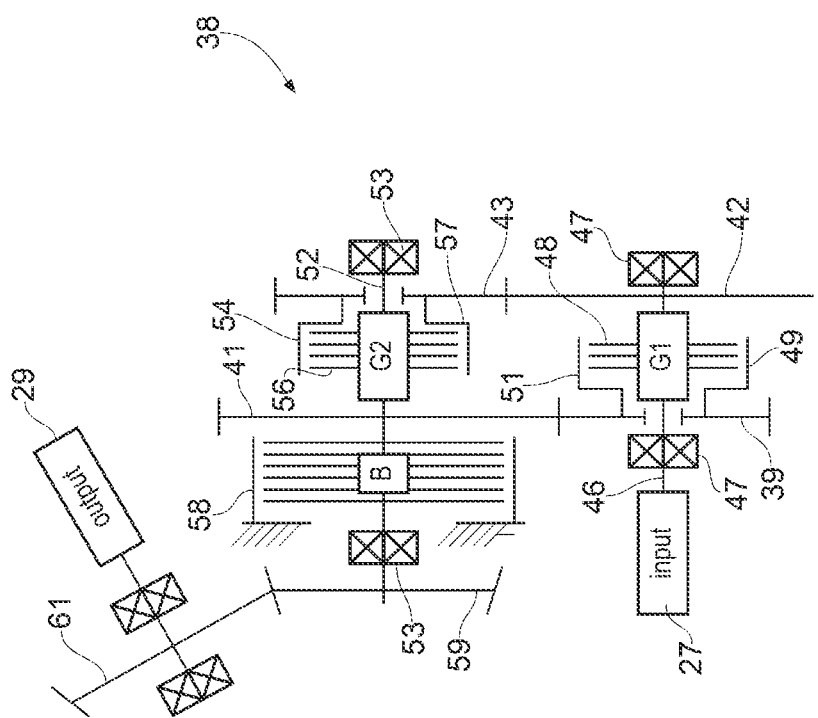
FIG. 3 is a schematic chart showing the functionality of a transmission per FIG. 2.

In FIGS. 2 and 3 the transmission 38 connects the rotary input shaft 27 to the flywheel shaft 29 at first and second selectable transmission ratios G1, G2 defined by driveline components within the transmission 38.

A first transmission ratio G1 is defined by mutually meshing, rotary, toothed gears 39, 41 that each are supported for rotation within the transmission 38. The first transmission ratio G1, in the first state of the baler 10, is a relatively great reduction ratio transmission providing a high degree of mechanical advantage.

A second transmission ratio G2 is defined by mutually meshing, rotary, toothed gears 42, 43 that each are supported for rotation within the transmission 38 adjacent the gears 39, 41 in a manner defining a parallel driveline to that representing the first transmission ratio G1. The second transmission ratio G2, in the first state of the baler, is a relatively close reduction ratio transmission providing a higher speed of output shaft rotation than the first transmission ratio G1.

The agricultural baling system includes a control unit 44, non-limitingly illustrated schematically in FIG. 1, in the form of a programmable microprocessor. In the embodiment of FIG. 1, the control unit is connected to the baler 10, which includes a source of electrical power, for the control unit 44, that in preferred embodiments may take the form of a rotary generator that is driven directly or indirectly by the PTO shaft, although other sources of electrical power including batteries and other storage devices, or other types of generator, are possible. Combinations of electrical power sources furthermore are possible.

As indicated, the control unit may take a variety of forms and need not be a control unit as illustrated, or a single component. The control unit may also be arranged on the tractor 11 or a remote location, such as a farm control centre, and communicate remotely with corresponding components of the baler.

The baler 10 optionally may include one or more input devices 77, represented schematically and non-limitingly in FIG. 1, by means of which information on the energy transmitted via the power take-off shaft 13 may be input to the control unit 44.

In FIG. 1 an input device 77 is shown in the form of a keypad connected to the control unit 44 via an electrical cable 78, and using which e.g. the rated power output of the tractor 11 can be input to the baler 10. The control unit can select a set of decision parameters (such as the preferred speed of plunger 23 at which to transition from the first transmission ratio G1 to the second transmission ratio G2) that are optimised for the input power level.

The input device 77 may take a variety of other forms. These include but are not limited to a code reader that can read a code printed or affixed on part of the tractor 11, e.g. adjacent the PTO; a near-field communications (NFC) device that establishes a communications link with a control unit forming part of the tractor 11 in order to download power output information; or a cable connection between the control unit 44 and a counterpart control unit forming part of the tractor 11.

The transmission 38 in preferred embodiments includes a rigid housing 79 that may be formed e.g. by casting from a metal alloy, especially a high stiffness, lightweight alloy.

As explained the baler 10 includes a number of frame elements 17. The housing 79 may be positioned to interconnect two or more such frame members (e.g. frame members 17a and 17b as non-limitingly illustrated in FIG. 1) in a manner enhancing the stiffness of the frame 17 of the baler 10.

In the illustrated embodiment such interconnection is achieved by way of perforated lugs 81, 82 by means of which the housing 79 is bolted to interconnect two frame members, but as will be apparent to the person of skill in the art such interconnection may be achieved in a variety of alternative ways.

The layout of the components of the transmission 38 inside the housing 79 is such that the driveline components 39, 41 defining the first transmission ratio G1 occupy a first vertically extending distance in the housing 79; and the driveline components 42, 43 defining the second transmission ratio G2 occupy a second vertically extending distance in the gearbox housing, the upper limit of the second vertically extending distance terminating below the upper limit of the first vertically extending distance.

This means that the transmission 38 is compact in the longitudinal dimension of the baler 10, and also that the output of the transmission 38 is connected to the flywheel shaft 29 at a relatively high point in the baler 10. This provides several advantages in terms of transferring drive input via the input shaft 27 to the location of the plunger 23, which as mentioned is located relatively high inside the baler 10.

The control unit 44 is capable (typically but not necessarily as a result of software and/or firmware programming) of selectively engaging the first or the second transmission ratio G1, G2. The arrangement of the components and/or the programming of the control unit 44 prevents the first and second transmission ratios from being selected simultaneously.

As best illustrated in FIGS. 2 and 3, the input shaft 27 rigidly connects to an input gear shaft 46 that is supported (non-limitingly in the embodiment illustrated by way of journal bearings 47 at either end) for rotational movement inside the transmission 38. The input gear shaft 46 is locked to the gear 42 such that the gear 42 always rotates with the input gear shaft 46.

The input gear shaft 46 is also locked to an input side 48 of a first transmission clutch 49 forming part of the driveline. As a result, the input side 48 of the first transmission clutch 49 also rotates with the input gear shaft 46.

The first transmission clutch 49 is e.g. electrically or electro-hydraulically activated in the described embodiment, and is selectively engageable under command from the control unit 44. When engaged the output side 51 of the first transmission clutch 49 is locked to the input side 48 and rotates therewith.

The output side 51 of first transmission clutch 49 is locked to the gear 39 of the first transmission ratio G1 such that the gear 39 rotates with the output side 51.

In the illustrated embodiment, the first transmission clutch 49 lies on the first gear shaft 46 intermediate the gears 39 and 42, but as will occur to the person of skill in the art this need not be the case, and other clutch and gear position combinations are possible.

As explained, the gears 42 and 43 are mutually meshed, with the gear 43 supported on the rotational intermediate gear shaft 52. The intermediate gear shaft 52 is supported (in the non-limiting example shown by way of journal bearings 53 at either end) for rotation relative to the remainder of the transmission 38.

By reason of locking of the input gear shaft 46 to the gear 42, the gear 43 rotates whenever the input gear shaft 46 rotates, at a speed, relative to the speed of the input gear shaft 46, determined by the gear tooth ratio between the gears 42 and 43. However, the gear 43 merely idles unless a second transmission clutch 54, which may be of a similar design to the first transmission clutch 49 and hence operable under command of the control unit 44, is engaged.

In this respect, the intermediate gear shaft 52 is locked to an input side 56 of a second transmission clutch 54; and an output side 57 is locked to the gear 43. As a result, when the clutch is engaged, rotation of gear 43 is transmitted via the intermediate gear shaft 52.

The gear 39 is meshed with the gear 41 as explained. The gear 41 is locked to the intermediate gear shaft 52. Clearly, therefore, to avoid locking up of the transmission it is essential that only one of the transmission clutches 49, 54 is engaged at a time. In the first state of the baler 10, when the first transmission clutch 49 is engaged and the second transmission clutch 54 is disengaged, drive from the input shaft 27 is transmitted via the meshed gears 39 and 41 to drive intermediate gear shaft 52 in accordance with the first, reduction transmission ratio "G1" determined by the numbers of teeth of gears 39 and 41. At this time, the gears 42 and 43 rotate in an idling manner.

When the first transmission clutch 49 is disengaged and the second transmission clutch 54 is engaged, the drive of the input shaft 27 is transmitted via the gears 42 and 43 to the drive intermediate gear shaft 52 in accordance with the second transmission ratio "G2" determined by the numbers of teeth of the gears 42 and 43.

As explained herein, in the first state of the baler 10, the first transmission ratio G1 is a reduction ratio, in which the speed ratio exceeds 1. This provides a beneficial mechanical advantage when moving the flywheel 28 from rest. The second transmission ratio G2, in the first state of the baler 10, is an acceleration ratio, the speed ratio of which is a value less than 1. This causes rotation of the flywheel shaft 29 to be at a higher speed than that of the PTO shaft 13, in the first state of the baler 10. As will be described in more detail below, the first and the second transmission ratios G1, G2 will have opposite speed ratios, when the baler is operated in its second state.

It is possible for both the clutches 49, 54 to be disengaged simultaneously. In that case gears 42 and 43 would rotate, but no drive would be transmitted to intermediate gear shaft 52.

The intermediate gear shaft 52 includes, mounted thereon, a brake 58 that may be employed when both the transmission clutches 49, 54 are disengaged to slow the flywheel shaft 29, e.g. during the second state of the baler. The flywheel shaft 29 receives the rotary drive of intermediate gear shaft 52, when one of the transmission clutches 49, 54 is closed, via meshed output gears 59, 61.

The numbers of teeth of the gears 39, 41, 42, 43, 59 and 61 may be varied extensively in all the gears of the transmission 38 depending on the precise design of the transmission 38. The overall numbers of drive-transferring components in the transmission may be varied. Also as explained the driveline elements defining the transmission ratios need not be meshing, toothed gears and instead may adopt a range of other forms, including but not limited to the examples given above.

The transmission clutches 49 and 54 may be for example electrically (e.g. solenoid) operated, electro-mechanically operated or electro-hydraulically operated, under the control of the control unit 44. Preferably, but not essentially, the transmission clutches 49, 54 are spooled wet clutches the nature of which is familiar to the person of skill in the art and therefore does not require describing in detail herein. Wet clutches generally are highly suitable for computer or other electronic control, leading to rapid clutch engagement and disengagement.

One form of control of the transmission clutches 49, 54 is by electrical control signals transmitted from the control unit 44 to the first and second transmission clutches 49, 54. One form of control of the transmission clutches 49, 54 is illustrated schematically by electrical control signal line 66 (FIG. 1) that transmits commands from the control unit 44 to first transmission clutch 49; and control line 67 that transmits commands from the control unit 44 to second transmission clutch 54.

Two-way communication between the transmission clutches 49, 54 and the control unit 44 optionally is possible. Using two-way control, the transmission clutches 49, 54 can signify e.g. their operational (i.e. engaged or disengaged) status, information on the condition of wear parts such as friction plates, levels of clutch fluid in the event of the clutches being wet clutches as is preferred and similar operational variables. The control unit 44 can generate commands and/or warning signals in dependence on the signals received from the transmission clutches 49, 54.

The control unit 44 may further be connected to a rotational speed sensor 68 of the input shaft 27 and/or an oil temperature sensor 73 via electric signal line 74. A second rotational speed sensor 71 senses the speed intermediate gear shaft 52 and generates a signal proportional thereto. This signal is transmitted via electrical signal line 72 to the control unit 44. The speed of the intermediate gear shaft 52 is equal to the flywheel shaft speed such that the second rotational speed sensor 71 may also be considered to be a flywheel shaft speed sensor.

The control unit 44 is capable of selectively disengaging the rotary drive between the input shaft 27 and the shaft 29 that is rotatably connected to the flywheel 28. This possibility is explained further below in connection with operational sequences made possible by the apparatus of the present disclosure. The control unit 44 may also be capable of selectively activating the brake 58 of the transmission 38. Activation of the brake 58 will actively slow the rotational speed of the flywheel shaft 29 and thus the speed of the flywheel 28 that is connected to the flywheel shaft 29.

One way of controlling activation of the first and second clutch 49, 54 as well as the brake 58, is illustrated in FIG. 2. In this embodiment, the first and second clutches 49, 54 and the brake 58 are all hydraulically actuated devices. To this end, the baler comprises a hydraulic shift pump 90 for providing hydraulic fluid flow that may be used to control activation of the first and second clutches 49, 54 as well as the brake 58. Of course, the baler 10 may include a variety of other hydraulic pumps, such as lubrication and cooling oil pumps, which are not illustrated in any of the attached figures for simplicity. It should also be appreciated that the hydraulic schematic of FIG. 2 is simplified, e.g. by removing the return lines and simplification of the valve components used to control the hydraulic fluid flow provided by the pump 90. In the following, the baler 10 will be described in connection with a provision of drive power to a hydraulic shift pump 90 via the PTO shaft 13 and the flywheel 28 respectively. However, it should be noted that cooling/lubrication pumps may also be driven by the PTO shaft 13 and the flywheel 28. Accordingly, in some embodiments (not shown), a hydraulic cooling/lubrication pump is driven in the two below states of the baler.

The hydraulic pump 90 is connected to the baler 10 such that it is driveable by means of the PTO shaft 13. To this end, the hydraulic pump 90 may either be directly or indirectly connected to the PTO shaft 13. In one embodiment, the hydraulic pump 90 is connected to and driven by the input shaft 27. The input shaft 27 is, in turn, connected to the PTO shaft 13 via driveline components 25 that are only schematically illustrated in FIG. 2.

In one example, the shift pump 90 may be directly connected to the gear 42 that is permanently connected to the input shaft 27. A drive shaft of the pump 90 may be connected to one or more driven gears (not shown), which are in meshing contact with and driven by the sprockets of the gear 42. Of course, other pumps, such as cooling/lubrication pumps etc., could also be connected to the input shaft. In some embodiments, a cooling/lubrication pump is connected to the same drive shaft as the shift pump 90 shown in FIG. 2.

The baler has generally two states. In a first state, the pump 90 is driven by external drive power supplied to the baler, e.g. via the PTO shaft. In a second state, the pump 90 is driven by internal drive power provided to the baler, e.g. by the momentum of the flywheel 28 or any other internal energy storage device. As will be explained in more detail below, the control unit 44 may be configured to transfer the baler between its two states depending on input-power-data that is indicative of an external drive power available in the first state. In the embodiment of FIG. 2, the control unit 44 may determine, on the basis of the input-power data, if the PTO shaft 13 is supplying sufficient rotational input power (e.g. sufficient input speed) to drive the pump 90. Should this not be the case, then the control unit may determine a control-signal for transferring the baler into its second state, in which the pump is driven by the flywheel 28.

In the example of FIG. 2, the hydraulic pump 90 is connected to the PTO shaft 13 and the input shaft 27 in such a way that, in the first state of the baler, the pump 90 may be driven by the PTO shaft 13, whereas, in the second state of the baler, the hydraulic pump 90 may be driven by the input shaft 27. In one embodiment, the pump 90 may be directly connected to the input shaft, such that a rotational power of the input shaft may be used to drive the pump 90 in both states. In this example, in the first state of the baler, drive power available from the PTO shaft 13 will be supplied to the input shaft 27. The input shaft is connected to a drive shaft of the pump to pass on the rotational power received from the PTO shaft. In the second state, however, no or insufficient drive power (e.g. input speed) is available from the PTO shaft 13. Instead, in the second state, the drive power is supplied to the input shaft 27 by the flywheel 28 via the transmission 38. In particular, the flywheel momentum is used to drive the flywheel shaft 29, which in turn drives the mid-gear shaft 52. The mid-gear shaft 52 then transfers the flywheel drive power to the input shaft 27, which ultimately drives the pump 90.

In both states, the pump may also be connected to various other parts of the driveline of the agricultural system. For example, in some embodiments, the pump 90 may also be directly connected to the flywheel shaft 29 in one or both states of the baler. The pump 90 may be connected to and driven by the same part of the driveline in both states. Alternatively, the pump may be connected to and driven by different parts of the driveline. In either case, the pump 90 will be driven by rotational power supplied by the PTO shaft 13, in the first state of the baler, and by rotational power provided by the flywheel 28, in the second state of the baler.

The hydraulic pump 90 is arranged to provide hydraulic fluid flow from a reservoir 91 selectively towards the first clutch 49, the second clutch 54, and/or the brake 58. The hydraulic fluid flow provided by the hydraulic pump 90 may also be used to charge an accumulator 96, as will be described in more detail below.

As schematically represented in FIG. 2, the control unit 44 may be connected to a variety of control valves for selectively providing the flow of the hydraulic pump 90 for activation of the transmission components 49, 54, 58. The control unit 44 may be connected to a first control valve 92, e.g. a shut-off valve, for selectively providing hydraulic fluid flow from the pump 90 towards the second clutch 54. The control unit may be connected to a second control valve 93, e.g. a shut-off valve, for selectively providing hydraulic fluid flow from the pump 90 towards the brake 58. The control unit 44 may also be connected to a third control valve 94, e.g. a shut-off valve, for selectively providing the flow of the pump 90 to the first clutch 49. Finally, the control unit 44 may be connected to a fourth control valve 95, e.g. a shut-off valve, for selectively providing hydraulic flow from an accumulator 96 towards inlets of the first, second and third control valves 92, 93, 94. The fourth control valve 95 may thus be used to control discharge of hydraulic fluid from the accumulator 96 towards the clutches 49, 54 and/or the brake 58 of the transmission 38. The skilled person will appreciate that the fourth control valve 95 is entirely optional. The accumulator may be connected to an outlet of the shift pump 90 via a one-way valve 97 such that the accumulator may be charged during normal operation of the baler 10, i.e. when the pump 10 is provided with external power via the PTO shaft 13.

The control unit 44 may be electrically connected to each of the control valves 92, 93, 94, 95. In one example, the control valves may be solenoid activated valves, such that the control unit 44 may power the solenoids of the control valves 92, 93, 94, 95 to selectively open and close one or more of the control valves 92, 93, 94, 95.

In the first state of the agricultural baler, i.e. during a normal operation of the baler, the baler 10 is powered by rotational energy provided via the PTO shaft 13. As explained in detail above, the rotational energy of the PTO shaft 13 is transferred to the input shaft 27 via a one-way clutch 98. The rotational power of the input shaft 27 is then transferred to the flywheel 28 via the driveline including the transmission 38 and the flywheel shaft 29 shown in FIGS. 2 and 3. Accordingly, in the first state of the baler 10, the input shaft 27 acts as a power input shaft into the driveline of the baler 10. Similarly, the flywheel shaft 29 acts as a power output shaft, in the first state of the baler 10.

In this first state of the baler 10, the shift pump 90 is driven by the rotational power of the PTO shaft 13 and may be used, as explained above, to provide the components of the transmission 38 with hydraulic fluid flow for activation. In other words, the pump 90 may be used to adjust the transmission ratios of the transmission 38 to select speed ratios between the input shaft 27 and the flywheel shaft 29. As mentioned before, at the same time, rotational power of the PTO shaft 13 may be used, in this first state, to drive various other pumps, such as a cooling/lubrication pump for cooling and lubrication the brake 58 and the clutches 49, 54.

In the first state of the agricultural baler, e.g. during normal baling operation, the first transmission ratio G1 is typically selected temporarily, until the flywheel 28 has reached a certain rotational speed. This is particularly the case during start-up of the agricultural baler, which is when the mechanical advantage of the first transmission ratio may be useful to provide the torque required to start moving the flywheel 28 and, when required, the corresponding plunger 23. After some time, e.g. when the flywheel 28 has reached a predetermined rotational speed, the transmission ratio may be switched from the first transmission ratio G1 to the second transmission ratio G2.

The agricultural baler of the present disclosure also includes a second state, in which the PTO shaft 13 no longer provides power to the baler. This may, for example, be the case if the tractor engine has been turned off or the PTO shaft has been disconnected in order to stop the agricultural machinery. Although in the second state of the baler 10 the PTO shaft 13 no longer provides power, the baler 10 still has power available in the form of flywheel inertia. According to the present disclosure, in the second state of the baler, the inertia of the flywheel 28 is used to drive the hydraulic pump 90 even when the PTO shaft 13 has come to a standstill or is running at a low speed.

It will be appreciated that the second state of the baler may only be available after a baler start-up, i.e. once the flywheel 28 has gained sufficient rotational speed. In other words, during the start-up, the baler may always be in the first state, in which the pump 90 and the flywheel 28 are both driven by external input power, e.g. provided via the PTO shaft 13 of the tractor 11. Once the flywheel 28 has reached its operational speed/momentum, the baler 10 may be transferred between its first and second state, e.g. by activating or deactivating the PTO shaft respectively. If the PTO shaft is active, and thus provides rotational power/speed to the baler components (e.g. the pump), the baler is in its first state. If the PTO shaft is deactivated, at a time after the start-up (e.g. at the end of the working day or in case of an emergency), and thus no longer provides external power to the baler components, the baler will be transferred into its second state, in which the inertia of the flywheel is used to drive the pump.

In the second state of the baler 10, the flywheel shaft 29 may be considered as an input shaft, whereas the input shaft 27 may be considered as an output shaft for of the driveline. A rotational energy of the flywheel 28 is transferred via the transmission 38 to the input shaft 27 and used to drive the pump 90. Transfer of the rotational power of the input shaft 27 back to the PTO shaft is prevented by the one-way clutch 98.

Similar to the first state described above, the control unit may selectively engage the first or second clutch, 49, 54, in order to select the appropriate transmission ratio G1, G2. In the second state of the baler, the flywheel shaft 29 is an input shaft of the transmission 38, and so the transmission ratios G1 and G2 are reversed. In detail, in the second state of the baler, the first transmission ratio G1 is an acceleration ratio, e.g. the speed ratio of the first transmission G1 is below 1.

Similarly, the second transmission ratio G2, in the second state of the baler, is a reduction ratio, i.e. the speed ratio of the second transmission ratio G2 is higher than 1. This is because, in the second state of the baler, the gears 41 and 43 act as drive gears, whereas the gears 39 and 42 act as driven gears.

It follows from the above that, in the second state of the baler, the rotational speed of the input shaft 27 (here the output shaft) is higher than the rotational speed of the flywheel shaft 29 (here the input shaft) if the first transmission ratio G1 is selected, whereas the speed of the flywheel shaft 29 is higher than the rotational speed of the input shaft 27, if the second transmission ratio G2 is selected. Since, in the second state of the baler, the input shaft 27 is used to drive the hydraulic pump 90, it may be preferable to select the first transmission ratio G1 in the second state of the baler to accelerate the rotational speed of the input shaft 27 and thus provide higher fluid flow via the pump 90. Of course, it is equivalently feasible to select the second transmission ratio G2 in the second state of the baler to transfer drive power of the flywheel 28 to the input shaft 27 and ultimately to the pump 90.

In the second state of the baler 10, it is usually desirable to decelerate the flywheel 28 quickly to prevent injuries from operators touching the rotating flywheel 28. To this end, the agricultural baler of the present disclosure provides a way of driving the hydraulic pump 90 even if no external drive power is received, e.g. from the PTO shaft 13. The hydraulic flow provided by the pump 90 in the second state of the baler, i.e. when drive power is provided internally by the flywheel 28, may be used to activate the brake 58 so as to more quickly decelerate the flywheel 28. In other words, the energy of the flywheel 28 may be converted into input power for the pump 90, which is ultimately used to brake the flywheel 28. At the same time, the internal power provided by the flywheel momentum may be used to drive other hydraulic pumps of the system, such as a cooling/lubrication pump to cool the clutches 49, 54 and/or the brake 58 until the flywheel 28 has come to a standstill.

It will be appreciated that the rotational energy provided by the inertia of the flywheel 28 may not be sufficient to drive the pump 90 until the flywheel 28 has come to a complete standstill. In such a case, just before the flywheel comes to a complete standstill, the flywheel 28 may still be rotating at a low speed that is not enough to allow the hydraulic pump to actuate the brake 58. The control-unit 44 may determine such a scenario on the basis of the flywheel-power-data. In one example, the flywheel-power-data may be representative of a rotational speed of the flywheel 28. The control unit 44 may be configured to compare the rotational speed of the flywheel 28 with a threshold value to determine if the speed is sufficient to drive the pump 90. If the flywheel speed is insufficient, i.e. the speed value drops below the threshold, the control unit may determine an accumulator-control-signal for switching the control valve 95 to direct hydraulic flow from the accumulator 96 towards the brake 58 of the transmission 38. In other words, the accumulator 96 may be used to fully stop the flywheel 28, once the inertia of the flywheel 28 is no longer sufficient to drive the pump 90. The accumulator 96 may be filled with hydraulic fluid from the shift pump 90 via the one way valve 97, during the first state of the agricultural baler, i.e. when external sufficient power is available to drive the pump 90, e.g. via the PTO shaft 13.

Figure 4:
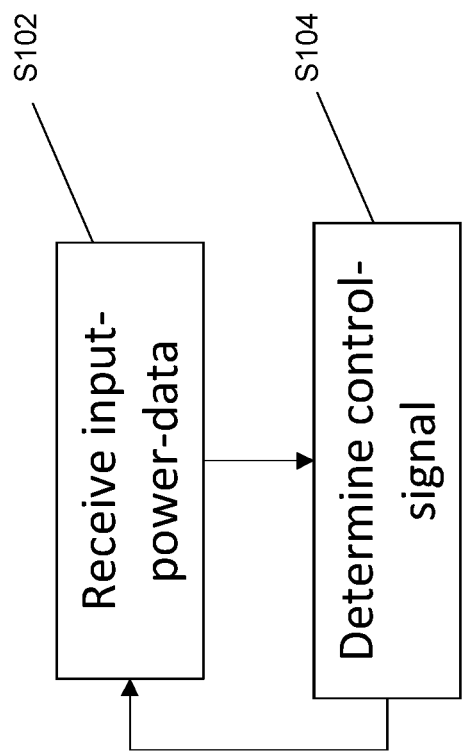
FIG. 4 is a schematic flow chart of a method according to the present disclosure.

Turning to FIG. 4, there is shown a schematic flow chart of a method according to the present disclosure. The method is for controlling an agricultural baler comprising a rotary input shaft connectable by way of a baler driveline to a rotatable flywheel and a hydraulic pump for supplying the agricultural baler with hydraulic fluid, the rotating flywheel being connectable to the hydraulic pump via the driveline.

The method comprises a first step S102 for receiving input-power-data. The input-power-data is indicative of an external drive power available for driving the hydraulic pump. Such external drive power may be provided by means of an associated tractor or an external power supply unit, such as a battery pack. The external drive power may be provided by a PTO shaft for transfer of drive power from an engine of the associated tractor to the baler. In one embodiment, the input-power-data may comprise information about the rotational speed of a PTO shaft providing rotational input power to the baler. In another example, a status of the PTO clutch 20 may be provided as input-power-data on the basis that no input power is provided if the PTO clutch 20 is disengaged and vice versa. Alternatively, the input-power-data may comprise status information about the engine of an associated work vehicle, such as a tractor. In this regard, it will be appreciated that the engine of an associated work vehicle will only be able to provide power to the hydraulic pump if the engine is still running.

In a second step S104, the method includes determining a control-signal on the basis of the input-power-data received in step S102. In one example, the method step S104 may include determining a control-signal for driving the hydraulic pump by means of the rotatable flywheel, if the input-power-data indicates that the available drive power is insufficient for driving the hydraulic pump. The control unit may determine the availability of sufficient drive power on the basis of a rotational speed of the input shaft 27 (FIG. 2). A speed sensor, such as speed sensor 68 of FIG. 1, may provide the control unit with input-speed-data indicative of a rotational speed of the input shaft. The control unit may compare the values of the input-speed-data with a first input-speed-threshold. The input-speed-threshold may be set such that input shaft speeds below the first-input-speed-threshold are not sufficient to provide the hydraulic pumps of the system with enough energy to apply the brake 58 and/or select one of the two transmission ratios G1, G2 described above. If one or more of the values of the input-speed-data fall below the first input-speed-threshold, the control unit may transfer the baler 10 from its first state into its second state. In other embodiments, the step S104 may simply include determining a control-signal for driving the hydraulic pump by means of the rotatable flywheel, if the input-power-data indicates that an associated tractor engine has been turned off and/or the PTO clutch 20 has been disengaged.

As mentioned before, switching the baler between its first and second state may include a variety of adjustments to the transmission 38 and/or changes in how the hydraulic fluid flow provided by the pump is directed. The control-signal may be any control instruction provided by the control unit to effect such changes. Consider a scenario in which the PTO clutch 20 is disengaged during normal operation of the baler. During normal operation, the second clutch 54 is engaged and the first clutch 49 is disengaged. The brake 58 is inactive. As described above, the control-unit may receive input-speed-data, which the control-unit may compare to a first input-speed-threshold. If the one or more values of the input-speed-data drop below the first input-speed-threshold, e.g. due to the disengagement of the PTO clutch 20, the control unit may determine that external input power is no longer available/sufficient via the PTO shaft 13. At this point, the baler 10 is transferred from its first state to its second state. In the second state, the control-unit may provide control-signals for maintaining the second clutch 54 engaged and activating the brake 58 so as to slow down the flywheel 28.

In a further embodiment, in the second state of the baler 10, the control-unit may be provided with flywheel-speed-data indicative of a rotational speed of the flywheel 28. The flywheel-speed-data may be provided to the control unit by a speed sensor, such as the second speed sensor 71 described with respect to FIG. 4. The control-unit may compare the values of the flywheel-speed-data with a predetermined flywheel-speed-threshold. The flywheel-speed-threshold may be set to a minimum flywheel speed that is sufficient for driving the one or more hydraulic pumps, when the transmission 38 is set to its second transmission ratio G2.

If one or more values of the flywheel-speed-data fall below the above flywheel-speed-threshold the control unit may determine a control-signal for selecting the first transmission ratio G1 of the transmission 38. It will be appreciated that selecting the first transmission ratio G1, in the second state of the baler 10, will increase the speed of the input shaft 27 despite a drop in the rotational speed of the flywheel 28, due to the accelerating gear ratio of gears 41 and 39. Switching the gear ratio at this point enables the system to drive the pumps by means of the flywheel momentum for an extended amount of time. It should be noted that the brake 58 remains active during and after the above gear change.

In yet another embodiment, in the second state of the baler 10, the control unit may compare the above input-speed-data values to a second input-speed-threshold. The second input-speed-threshold may be lower than the first input-speed-threshold. If one or more values of the input-speed-data drop below the second input-speed-threshold, the rotational power of the input shaft may no longer be sufficient to provide the shift pump 90 with enough power to activate the brake 58. The control-unit may thus activate the brake 58 with hydraulic fluid from the accumulator 96, e.g. by switching the fourth control valve 95, until the flywheel 28 has a come to a complete standstill.

Although the above has been described in connection with the hydraulic shift pump schematically represented in FIG. 2, it should be noted that cooling/lubrication pumps may also be driven by the baler in both states. In some embodiments, a hydraulic cooling/lubrication pump is driven in parallel with the shift pump shown in FIG. 2, in both states of the baler. In a further feasible alternative, both the shift pump and the cooling/lubrication pump may be driven by the PTO shaft/the input shaft during the first state, whereas only the cooling/lubrication pump may be driven by the flywheel in the second state of the baler.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. An agricultural system comprising:
   an agricultural baler comprising:
   a rotatable flywheel;
   a baler driveline;
   a rotary input shaft connected by the baler driveline to the rotatable flywheel; and
   a hydraulic pump for supplying the agricultural baler with hydraulic fluid, the rotatable flywheel connected to the hydraulic pump via the driveline,
   wherein the baler is transferrable between a first state for driving the hydraulic pump by external drive power provided by a corresponding work vehicle, and a second state for driving the hydraulic pump the rotatable flywheel,
   a control unit that is programmed to:
   receive input-power-data indicative of the external drive power available for driving the hydraulic pump in the first state of the baler; and
   determine a control-signal for driving the hydraulic pump by the rotatable flywheel in the second state, if the input-power-data indicates that the available external drive power is insufficient for driving the hydraulic pump.

2. The agricultural system of claim 1, wherein the baler driveline comprises at least one brake for braking a rotation of the flywheel, and wherein the control unit is further configured to determine a control signal applicable to activate the brake, when the baler is in the second state.

3. The agricultural system of claim 1, wherein the input-power-data is indicative of an input shaft speed, and wherein the control unit is further configured to determine a control signal for transferring the baler into its second state, if the input-power-data indicates that the input shaft speed is below a predetermined input-speed-threshold.

4. The agricultural system of claim 1, wherein the driveline includes a transmission including driveline components defining at least first and second selectable transmission ratios between the input shaft and the flywheel, wherein, in the first state of the baler, the first transmission ratio is a reduction ratio and the second transmission ratio is an acceleration ratio, and wherein, in the second state of the baler, the first transmission ratio is an acceleration ratio and the second transmission ratio is a reduction ratio.

5. The agricultural baler of claim 4, wherein the control unit is further configured to determine a control signal applicable to selectively engage driveline components defining the second transmission ratio, when the baler is in the first state.

6. The agricultural system of claim 4, wherein the control unit is further configured to determine a control signal applicable to selectively engage driveline components defining the first transmission ratio, when the baler is in the second state.

7. The agricultural system of claim 6, wherein the transmission further includes a first clutch for selectively activating the first transmission ratio, and wherein the hydraulic pump is selectively connectable to the first clutch for provision of hydraulic fluid for selectively engaging the first clutch.

8. The agricultural system of claim 7, wherein the transmission further includes a second clutch for selectively activating the second transmission ratio, and wherein the hydraulic pump is selectively connectable to the second clutch for provision of hydraulic fluid for selectively engaging the second clutch.

9. The agricultural system of claim 1, wherein the agricultural baler further comprises an accumulator connected to a pump outlet of the hydraulic pump, and wherein the control unit is further configured to charge the accumulator via the hydraulic pump, when the baler is in the first state.

10. The agricultural system of claim 1, wherein the accumulator is selectively connectable to the at least one brake for selectively supplying hydraulic fluid to the at least one brake, when the baler is in the second state.

11. The agricultural system of claim 1, wherein the agricultural baler further comprises a one-way clutch for connecting the rotatable input shaft to a power take-off shaft of a corresponding work vehicle, the one-way clutch permitting power transfer from the power take-off shaft towards the input shaft, and the one-way clutch preventing power transfer from the input shaft towards the power take-off shaft.

12. The agricultural system of claim 1, further comprising an agricultural work vehicle connected to the agricultural baler.

13. The agricultural system of claim 12, wherein the agricultural work vehicle comprises a power take-off shaft connectable to the input shaft of the agricultural baler for rotationally driving the input shaft.

14. A computer-implemented method for controlling an agricultural baler, the baler comprising:
- a rotatable flywheel;
- a baler driveline;
- a rotary input shaft connected by the baler driveline to the rotatable flywheel; and
- a hydraulic pump for supplying the agricultural baler with hydraulic fluid, the rotatable flywheel being connectable to the hydraulic pump via the driveline, wherein the method comprises:
- receiving input-power-data indicative of an external drive power available for driving the hydraulic pump in the first state of the baler; and
- determining a control-signal for driving the hydraulic pump by the rotatable flywheel, if the input-power-data indicates that the available external drive power is insufficient for driving the hydraulic pump.

\* \* \* \* \*